(12) United States Patent
Lang et al.

(10) Patent No.: US 8,727,201 B2
(45) Date of Patent: May 20, 2014

(54) TOOL FOR ULTRASONIC WELDING DEVICE

(71) Applicant: Telsonic Holding AG, Bronschhofen (CH)

(72) Inventors: Georg Lang, Triefenstein (DE); Stefan Rosiwal, Triefenstein (DE); Matthias Lodes, Triefenstein (DE); Katharina Neuerer, Triefenstein (DE)

(73) Assignees: Telsonic Holding AG, Bronschhofen (CH); Friedrich-Alexander-Universitaet Erlangen-Nuernberg, Erlangen (DE)

( * ) Notice: Subject to any disclaimer, the term of this patent is extended or adjusted under 35 U.S.C. 154(b) by 0 days.

(21) Appl. No.: 13/796,623

(22) Filed: Mar. 12, 2013

(65) Prior Publication Data

US 2013/0240606 A1     Sep. 19, 2013

(30) Foreign Application Priority Data

Mar. 14, 2012 (DE) .................. 10 2012 204 025
Aug. 27, 2012 (DE) .................. 10 2012 215 191

(51) Int. Cl.
*B23K 1/06* (2006.01)
*B29C 65/08* (2006.01)
*B32B 37/00* (2006.01)

(52) U.S. Cl.
USPC .............. 228/1.1; 228/110.1; 156/580.2

(58) Field of Classification Search
None
See application file for complete search history.

(56) References Cited

U.S. PATENT DOCUMENTS

| | | | | |
|---|---|---|---|---|
| 4,890,782 A * | 1/1990 | Nakai et al. | ............... | 228/114.5 |
| 4,988,421 A * | 1/1991 | Drawl et al. | ............... | 204/192.3 |
| 5,217,154 A * | 6/1993 | Elwood et al. | ............... | 228/4.5 |
| 5,316,842 A * | 5/1994 | Herb et al. | ............... | 428/319.1 |
| 5,445,887 A * | 8/1995 | Casti | ............... | 428/408 |
| 5,529,805 A * | 6/1996 | Iacovangelo et al. | ..... | 427/249.18 |
| 5,614,314 A * | 3/1997 | Itoh et al. | ............... | 428/332 |
| 5,679,454 A * | 10/1997 | Hiwatashi | ............... | 428/332 |
| 5,851,658 A * | 12/1998 | Yamamoto et al. | ............... | 428/334 |
| 5,944,573 A * | 8/1999 | Mearini et al. | ............... | 445/50 |
| 5,955,155 A * | 9/1999 | Yamamoto et al. | ............... | 427/577 |
| 6,284,376 B1 * | 9/2001 | Takenouchi et al. | ............... | 428/408 |
| 6,558,742 B1 * | 5/2003 | Tzeng | ............... | 427/249.8 |
| 6,565,618 B1 * | 5/2003 | Ishizuka | ............... | 51/307 |
| 7,549,567 B2 * | 6/2009 | Higashi et al. | ............... | 228/110.1 |
| 2004/0065711 A1 * | 4/2004 | Sung | ............... | 228/4.5 |
| 2004/0137230 A1 * | 7/2004 | Airoldi et al. | ............... | 428/408 |
| 2005/0061233 A1 * | 3/2005 | Linares et al. | ............... | 117/84 |
| 2005/0205641 A1 * | 9/2005 | Takeuchi et al. | ............... | 228/1.1 |
| 2006/0189026 A1 * | 8/2006 | Cropper et al. | ............... | 438/82 |
| 2008/0070049 A1 * | 3/2008 | Guo et al. | ............... | 428/457 |
| 2010/0064538 A1 * | 3/2010 | Scarsbrook et al. | ............... | 33/559 |
| 2010/0203341 A1 * | 8/2010 | Egan | ............... | 428/409 |
| 2010/0209665 A1 * | 8/2010 | Konovalov et al. | ............... | 428/141 |
| 2011/0151226 A1 * | 6/2011 | Twitchen et al. | ............... | 428/220 |
| 2011/0280790 A1 * | 11/2011 | Hemley et al. | ............... | 423/446 |
| 2012/0125976 A1 * | 5/2012 | Steiner | ............... | 228/110.1 |

FOREIGN PATENT DOCUMENTS

| | | | |
|---|---|---|---|
| EP | 0477585 A2 | * | 4/1992 |
| JP | 01-280327 A | * | 11/1989 |
| WO | 2009/060080 A2 | | 5/2009 |

\* cited by examiner

*Primary Examiner* — Kiley Stoner
(74) *Attorney, Agent, or Firm* — Manabu Kanesaka

(57) ABSTRACT

The invention relates to a tool for an ultrasonic welding device, wherein a contact face of a carrier body (1) produced from a metal facing a component to be welded is provided with a diamond coating (3). To improve the durability, it is proposed in accordance with the invention for the diamond coating to be produced by means of CVD methods and to have a thickness (D2) in the range from 0.5 to 20 μm.

22 Claims, 2 Drawing Sheets

TOOL FOR ULTRASONIC WELDING DEVICE

RELATED APPLICATIONS

The present application is based on, and claims priority from, German Application No. DE 10 2012 204 025.0 filed Mar. 14, 2012, and German Application No. DE 10 2012 215 191.5 filed Aug. 27, 2012, the disclosure of which is hereby incorporated by reference herein in its entirety.

The invention relates to a tool for an ultrasonic welding device according to the preamble of claim 1.

Such a tool is known for example from WO 2009/060080 A2. With the known tool, the diamond coating is formed from polycrystalline diamond (PCD). With PCD, diamond crystals are incorporated in a metal matrix in a randomly oriented manner. PCD is produced by sintering at high pressure and high temperatures. To produce the known tool, a carrier receiving the PCD has to be connected to the tool part in question, for example by means of soldering. The production of the known tool is complex and costly. In addition, an undesirable adhesion between a component part to be welded and the tool cannot always be reliably avoided.

The object of the invention is to overcome the disadvantages according to the prior art. In particular, a tool that can be produced in the simplest and most cost-effective manner possible for an ultrasonic welding device is to be specified, with which adhesion of a component to be welded can be securely and reliably avoided. In accordance with a further objective of the invention, the tool is to have improved durability, in particular when in continuous use.

This object is achieved by the features in claim 1. Expedient embodiments of the invention will emerge from the features in claims 2 to 14.

In accordance with the invention, it is proposed for the diamond coating to be produced by means of CVD a method and to have a thickness in the range from 0.5 to 20 µm. A diamond coating produced by means of a CVD method is characterized in that it has no metal binder phase, in contrast to a PCD coating. Such a diamond coating is substantially monophase. It has surprisingly been found that this diamond coating outstandingly withstands the thermal and mechanical stresses during ultrasonic welding. In addition, the diamond coating produced by the CVD method is characterised in that it has a particularly low tendency to adhere to the components to be welded.

The proposed diamond coating has a thickness in the range from 0.5 to 20 µm, preferably less than 20 µm. A tool coated with a diamond coating according to the invention having a thickness in the range from 0.5 to 20 µm is characterised by a particularly long service life in spite of the extreme stresses during ultrasonic welding.

In accordance with an advantageous embodiment, the diamond coating has a thickness in the range from 1 to 15 µm, preferably 1.5 to 5.0 µm. Diamond coatings having a thickness in the range from 2 to 12 µm are characterised by outstanding durability. Diamond coatings of this type can be produced relatively easily and cost-effectively by means of the CVD method.

In accordance with a further particularly advantageous embodiment, in the Raman spectrum with a wavelength of 514.5 mm (green laser light), the diamond coating has a first peak in the range from 1335 to 1345 l/cm and a second peak in the range from 1345 to 1355 l/cm. The two observed peaks are the result of a peak shift caused by stresses and peak splitting of a peak that lies at 1332.5 l/cm, and characterises a relaxed diamond lattice. In other words, the diamond coating produced by the CVD method advantageously has internal stresses. It is assumed that the internal stresses contribute to improved durability of the diamond coating. The internal stresses σ are expediently 1 to 6 GPa, preferably 1 to 5 GPa, particularly preferably 1 to 4 GPa.

In accordance with a further embodiment of the invention, the thickness of the diamond coating deviates by at most 10% compared to an average thickness of the diamond coating. It has been found that the proposed uniform thickness of the diamond coating in turn contributes to improved durability with use of the proposed tool for ultrasonic welding.

An average diameter of the diamond crystals forming the diamond coating is advantageously 0.05 to 20 µm, preferably 0.5 to 3.0 µm, at a surface of the diamond coating. In other words, the proposed diamond coating is characterised by diamond crystals having a relatively small average diameter at the surface.

In accordance with a further embodiment of the invention, a thermal conductivity of the diamond coating is 2 to 2000 W/mk. The use of a diamond coating with a thermal conductivity in the range from 500 to 1500 W/mk is preferred. A high thermal conductivity contributes to the fact that the heat transferred from the component to the diamond coating is dissipated as quickly as possible to the carrier body. This contributes in addition to the avoidance of adhesion between the components to be welded and the tool.

In accordance with a further embodiment of the invention, the diamond crystals contain 50 to 100000 ppm of boron. Surprisingly, a diamond coating provided with boron has a particularly good service life. In accordance with a further advantageous embodiment, a diamond coating with an electrical conductivity is used. An electrical resistivity of the diamond coating is expediently $10^{-3}$ to $10^4$ S/m. The use of an electrically conductive diamond coating makes it possible to identify damage to the diamond coating by means of a continuous measurement of the electrical resistivity, and in particular to duly disconnect automatically operating ultrasonic welding devices in order to avoid further damage.

The carrier body is advantageously made from titanium, titanium alloy, molybdenum, molybdenum alloy, tungsten, tungsten alloy, or hard metal. With a carrier body produced from a titanium alloy, a TiC coating having a thickness in the region from 10 nm to 2.0 µm, preferably 0.5 to 2.0 µm, is expediently incorporated between the carrier body and the diamond coating. The proposed TiC coating in turn contributes to improved durability of the diamond coating. As a result of the provision of a suitable TiC coating, the resistance of the diamond coating to chipping of the carrier body is considerably improved.

Even with a carrier body produced from hard metal, an intermediate coating may be incorporated between the carrier body and the diamond coating. The intermediate coating expediently consists of chromium carbide or TiN. It advantageously has a thickness in the range from 1 to 50 µm, preferably 1 to 5 µm. This intermediate coating also contributes to an improved retention of the diamond coating on the support body.

The tool according to the invention may be at least one of the following elements: sonotrode, anvil, lateral slide. In particular, static elements such as an anvil or lateral slide are preferably provided with the diamond coating according to the invention.

The carrier body may expediently also be formed as an insert for insertion into a corresponding recess on the anvil. In this case, the carrier body is formed for example as a flat metal plate.

Exemplary embodiments of the invention will be explained in greater detail hereinafter in the basis of the drawings, in which.

Figure 1:
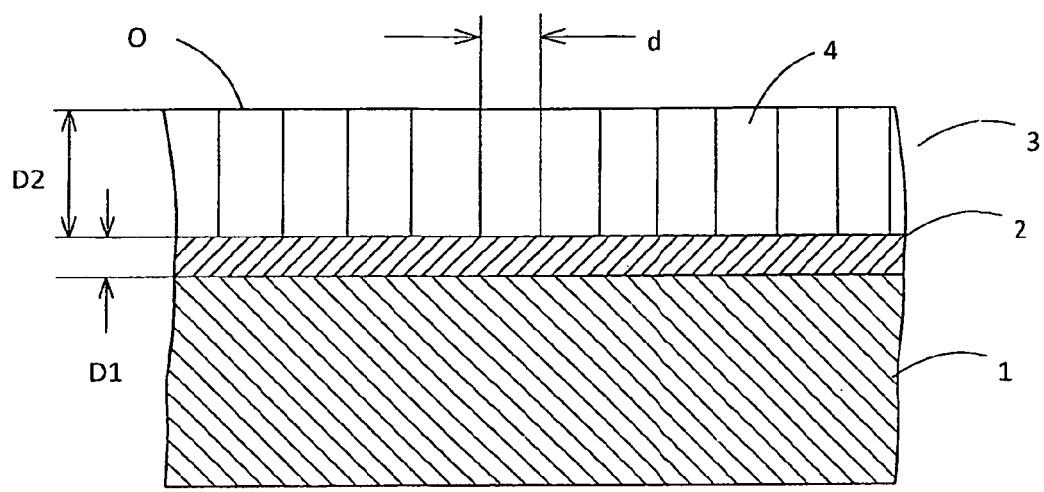
FIG. 1 shows a schematic side view through a tool.

FIG. 1 shows a schematic partial cross-sectional view through a tool according to the invention, for example an anvil or a lateral slide of an ultrasonic welding device. The tool has a carrier body 1 produced from metal. For example, the metal is Ti-6Al-4V. Reference sign 2 denotes an intermediate coating, which is formed in this case from TiC. The intermediate coating 2 has a first thickness S1 of approximately 0.5 to 1.5 μm. The intermediate coating 2 is coated by a diamond coating 3. The diamond coating 3 has a second thickness D2 of preferably 2 to 12 μm. It is formed from diamond crystals 4, which extend substantially perpendicularly from the interface to the intermediate coating 2. At a surface O, the diamond crystals 4 have a diameter d from 0.05 to 5.0 μm. An average diameter (not shown here) is expediently 0.5 to 3.0 μm. The diameter d of the diamond crystals 4 is advantageously less than the second thickness D2. The average diameter is expediently 0.1 to 0.8 times the second thickness D2.

To produce the tool, the surface to be coated of the carrier body is first ground, wherein a graining in the range from 2000 to 5000, preferably 3000 to 4500, is used. The surface can also be electrochemically eroded. The surface is then irradiated by a radiation means at 2 to 4 bar. The radiation means may be SiC for example with an average particle size in the range from 20 to 50 μm. Furthermore, the surface thus prepared can be etched. Diamond seeds are then advantageously applied to the surface.

The CVD diamond coating 3 shown in FIG. 1 is produced for example by means of hot filament chemical vapour deposition (HF-CVD). The gas phase used during this process may contain 0.5 to 4.0 vol. %, preferably 1.0 to 1.5 vol. %, of methane. Furthermore, the gas phase may be mixed with 96.0 to 99.5 vol. % of hydrogen and optionally 1.5 to 3.5 vol. % of oxygen and/or boron. The gas pressure during the coating process is 8 to 12 mbar, preferably 10 mbar.

Figure 2:
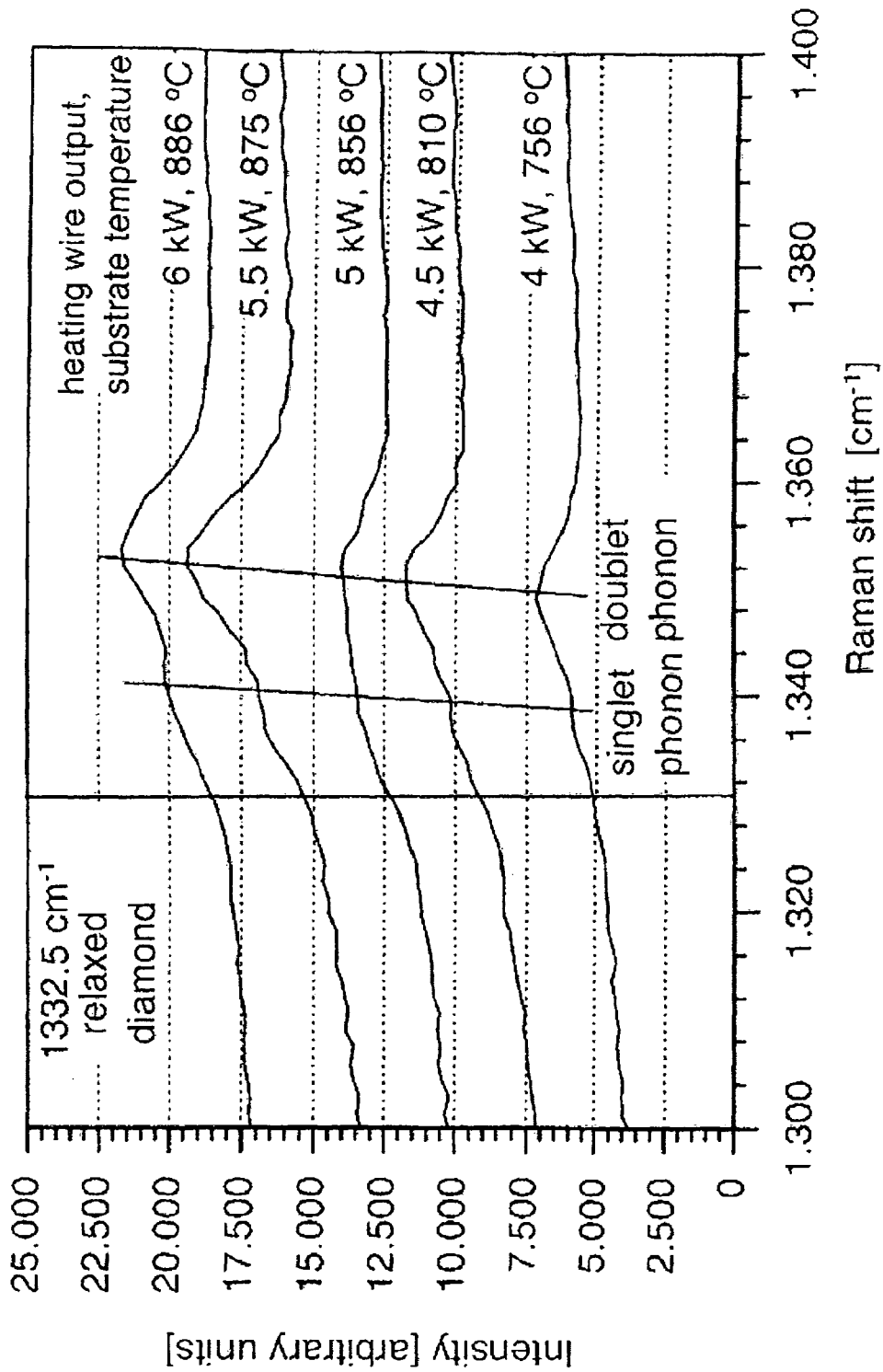
FIG. 2 shows Raman spectra of different CVD diamond coatings.

FIG. 2 shows Raman spectra of various diamond coatings, which have been applied by means of HF-CVD methods to a carrier body formed from Ti-6Al-4V. The pressure during the coating process was 10 mbar in each case. The hydrogen flow was 1000 ml/min and the methane flow was 10 ml/min. The Raman spectra shown in FIG. 2 were each recorded for diamond coatings produced with increasing heating wire output and substrate temperature.

As can be seen from FIG. 2, the produced diamond coatings do not display a peak at 1332.5 1/cm, which indicates a relaxed diamond lattice. By contrast, all CVD diamond coatings display a first peak in the range from 1335 to 1345 1/cm and a second peak in the range from 1345 to 1355 1/cm. The first peak corresponds to the singlet phonon oscillation, and the second peak corresponds to the doublet phonon oscillation. The first and the second peak occur as a result of a peak split of the peak indicating a relaxed diamond lattice at 1332.5 1/cm. The peak split is caused by internal stresses in the diamond coating. It can be concluded from the position of the first and second peak that the produced CVD diamond coatings have internal stresses σ a in the range from 1 to 6 GPa. It has been proven to be expedient, for coating for tools for ultrasonic welding devices, to use CVD diamond coatings that have internal stresses in the range from 1 to 4 GPa.

With regard to the coating of a tool for ultrasonic welding devices, it has proven to be particularly advantageous if a quotient from the second thickness D2 and the internal stress σ has a value K in the range from 0.2 to 15 μm/GPa, preferably 0.8 to 10 μm/GPa, particularly preferably 1 to 4 μm/GPa:

$$K = D2/\sigma = 0.2 \ldots 15 \text{ μm/GPa}$$

Diamond coatings with the aforementioned value K are characterised by particularly high durability with use in conjunction with tools for ultrasonic welding devices.

List of Reference Signs 1 carrier body
2 intermediate coating
3 diamond coating
4 diamond crystal
d diameter
D1 first thickness
D2 second thickness
O surface

The invention claimed is:

1. An ultrasonic welding device, comprising:
a tool with a carrier body formed of a metal including titanium or titanium alloy,
a diamond coating provided on a contact face of the carrier body facing a component part to be welded, and
a TiC coating disposed between the carrier body and the diamond coating, and having a thickness in a range from 10 nm to 2.0 μm,
wherein the diamond coating is produced by a CVD method and has a thickness in a range from 0.5 to 20 μm, and
in Raman spectrum, the diamond coating has a first peak in a range from 1335 to 1345 1/cm and a second peak in the range from 1345 to 1355 1/cm.

2. The ultrasonic welding device according to claim 1, wherein the diamond coating has the thickness in the range from 1 to 15 μm.

3. The ultrasonic welding device according to claim 1, wherein the thickness of the diamond coating deviates by at most 10% compared to an average thickness of the diamond coating.

4. The ultrasonic welding device according to claim 1, wherein an average diameter of diamond crystals forming the diamond coating is 0.05 μm to 20 μm at a surface of the diamond coating.

5. The ultrasonic welding device according to claim 1, wherein a thermal conductivity of the diamond coating is 2 to 2000 W/mk.

6. The ultrasonic welding device according to claim 4, wherein the diamond crystals contain 50 to 100000 ppm of boron.

7. The ultrasonic welding device according to claim 1, wherein an electrical resistivity of the diamond coating is $10^{-3}$ to $10^4$ S/m.

8. The ultrasonic welding device according to claim 1, comprising at least one of the following elements: sonotrode, anvil, or lateral slide.

9. The ultrasonic welding device according to claim 1, wherein the carrier body is formed as an insert for insertion into a corresponding recess on an anvil.

10. An ultrasonic welding device comprising:
a tool with a carrier body formed from a metal including steel;
a diamond coating provided on a contact face of the carrier body facing a component part to be welded; and
an intermediate coating incorporated between the carrier body and the diamond coating, and consisting of chromium carbide or TiN, wherein the diamond coating is produced by a CVD method and has a thickness in a range from 0.5 to 20 μm, the intermediate coating has a thickness in a range from 1 to 50 μm, and in Raman spectrum, the diamond coating has a first peak in a range from 1335 to 1345 1/cm and a second peak in a range from 1345 to 1355 1/cm.

11. The ultrasonic welding device according to claim 10, wherein the thickness of diamond coating is in the range from 1 to 15 μm.

12. The ultrasonic welding device according to claim 11, wherein the thickness of the diamond coating is in the range from 1.5 to 5.0 μm.

13. The ultrasonic welding device according to claim 10, wherein the thickness of the diamond coating deviates by at most 10% compared to an average thickness of the diamond coating.

14. The ultrasonic welding device according to claim 10, wherein an average diameter of diamond crystals forming the diamond coating is 0.05 μm to 20 μm at a surface of the diamond coating.

15. The ultrasonic welding device according to claim 10, wherein the average diameter of the diamond crystals forming the diamond coating is 0.5 to 3.0 μm at the surface of the diamond coating.

16. The ultrasonic welding device according to claim 10, wherein a thermal conductivity of the diamond coating is 2 to 2000 W/mk.

17. The ultrasonic welding device according to claim 14, wherein the diamond crystals contain 50 to 100000 ppm of boron.

18. The ultrasonic welding device according to claim 10, wherein an electrical resistivity of the diamond coating is $10^{-3}$ to $10^4$ S/m.

19. The ultrasonic welding device according to claim 10, wherein the tool is at least one of the following elements: sonotrode, anvil, or lateral slide.

20. The ultrasonic welding device according to claim 10, wherein the carrier body is formed as an insert for insertion into a corresponding recess on an anvil.

21. The ultrasonic welding device according to claim 2, wherein the thickness of the diamond coating is in the range from 1.5 to 5.0 μm.

22. The ultrasonic welding device according to claim 4, wherein the average diameter of the diamond crystals forming the diamond coating is 0.5 to 3.0 μm at the surface of the diamond coating.

* * * * *